April 29, 1947. W. E. BURTON 2,419,818
MEASURING GAUGE FOR MACHINE TOOLS
Filed April 15, 1944
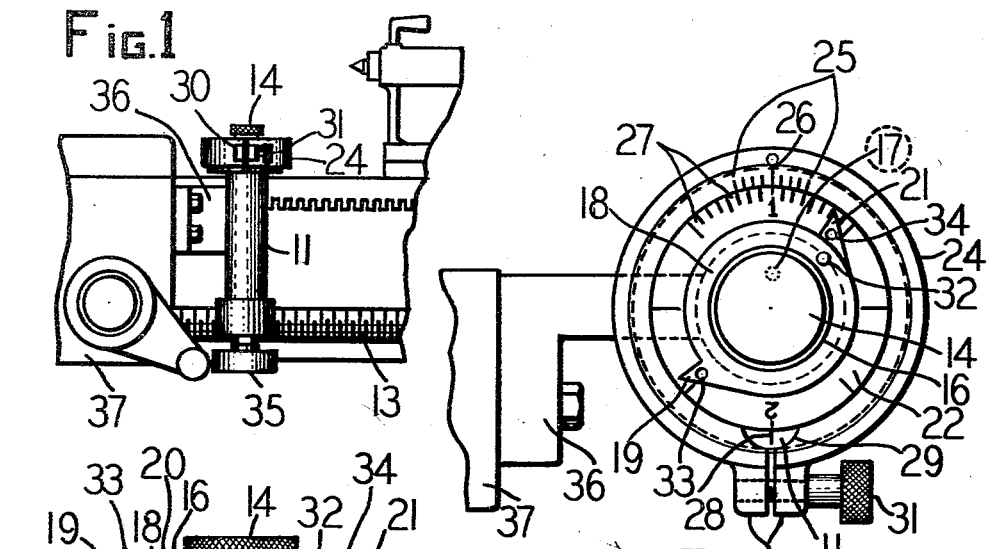
Fig. 1
Fig. 3
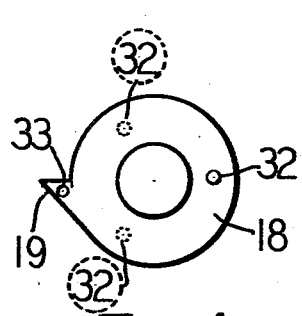
Fig. 2
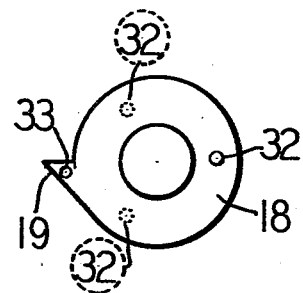
Fig. 4
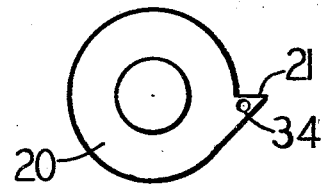
Fig. 5
WALTER ERVIN BURTON
INVENTOR.
BY F. E. Shannon
Attorney Patented Apr. 29, 1947

2,419,818

UNITED STATES PATENT OFFICE 2,419,818

MEASURING GAUGE FOR MACHINE TOOLS

Walter Ervin Burton, Akron, Ohio

Application April 15, 1944, Serial No. 531,196

6 Claims. (Cl. 33—125)

This invention relates to attachments for lathes and other machines and has for its purpose the providing of an improved indicator for determining accurately the tool position in cutting threads, boring, facing, turning and similar operations. While this improvement might be applied to a variety of different machines, its application to screw-cutting lathes will be described as typical of its uses.

Heretofore it has been the practice, in boring to a definite depth or making a longitudinal cut of definite length in either direction, to stop the lathe spindle and measure the cut with a scale, depth micrometer, or other similar device. Often this required that the lathe carriage and cutter be moved out of the way so the measuring tool could be used. All this results in a loss of time and often in spoiled work caused by over-cutting, reduces production, and increases costs. In some instances the operator can use the conventional threading indicator attached to the carriage for measuring the longitudinal travel of the cutting tool, but at best this produces only approximate measurements.

It is an object of this invention to provide an indicator having a dial arrangement that permits measuring cuts with sufficient accuracy to make unnecessary repeated measurements with a scale or micrometer.

A further object of the invention is to provide an indicator that may be combined with the thread-cutting gauge on a lathe without affecting the simplicity of operation of that gauge; an indicator that may be operated by the lead screw of the lathe or by a separate rack; or an indicator that may be mounted as a separate unit for indicating degree of movement of any part of a machine tool or other machine.

A further object of this invention is to provide an indicator having adjustable means whereby the points on the measuring scale for beginning and stopping a cut may be marked or set, thereby eliminating the necessity for the operator to remember or guess at these points. At the same time, there is provided a vernier device that permits these adjustable indicators to be set to close limits and lengths of cuts to be measured to thousandths of an inch or other small fractions of unit measure.

A further object of this invention is to provide an improved device of the character described which will be rugged and not easily affected by oil or dirt, that will be simple to operate even by the unskilled user, and that may be attached to existing machines without interfering with their operation.

To attain these and other new and useful objects, the invention consists of novel features and improvements which will be more fully described and claimed hereinafter.

In the drawings like symbols in the several views refer to corresponding parts.

Figure 1 is a fragmentary view showing in side elevation, portions of the carriage, bed, and tailstock of a conventional screw-cutting lathe with a measuring gauge incorporating the principles of the invention attached thereto.

Figure 2 is a central vertical sectional view of my improved gauge, parts being shown in side elevation and parts indicated by dotted lines.

Figure 3 is a plan view of the top of the gauge.

Figure 4 is a plan view of one of the adjustable indicator stops.

Figure 5 is a plan view of another of the adjustable indicator stops.

Referring to the drawings, the numeral 10 indicates the shaft of the measuring gauge, which rotates in the housing 11. The gear wheel 12, pinned or otherwise fastened to shaft 10, engages the lead screw or rack 13 on the lathe or other machine to which the gauge is attached by bracket 36. A thumb nut or knob 14 operating in conjunction with screw 15 is used to lock or loosen the adjustable stop indicators or pointer disks 18 and 20. Two such disks are shown, although any other needed number could be used. The lower disk 20 has a projecting hand or pointer 21 of any desirable shape that extends toward the margin of the measuring scale 27 on the dial 22. The upper disk 18 has a similar hand or pointer 19, also extending toward margin of dial 22. Hole 33 in pointer 19, and 34 in pointer 21 are for convenience in moving the pointer disks with the aid of a pencil, punch, or other pointed instrument. The bushing or collar 16 enables the knob or nut 14 to exert pressure upon disks 18 and 20, thus locking them in position with respect to dial 22. A pin, 17, fixed firmly in shaft 10 but loosely in a hole in the bushing 16, prevents the bushing 16 from turning and shifting the pointer disks as the screw 14 is tightened. The pointers 19 and 21 may be set at various positions with respect to the scale 27 on dial 22, to indicate the beginning and end of a lathe-tool cut or other operation. Dial 22 is fixedly attached to the shaft 10 by a set screw 23 or other means.

Encircling the dial end of housing 11 of the indicator is a vernier ring 24, which may be knurled for easy turning. A means of locking this ring fixedly in any position with respect to the housing 11 is provided, as by the split ring 30 and screw 31. The ring 24 bears an index mark 26 and a vernier scale 25. By means of this scale, used in conjunction with scale 27 on the dial 22, the movement of the lathe carriage and cutting tool may be measured with great accuracy. The ring may be provided with additional vernier scales if desired.

The graduations 27 on dial 22, while arranged so the dial movement indicates fractions of an inch or other unit of measure, are also arranged so certain of the marks may be used in thread cutting, in the manner in which graduations on conventional threading-indicator dials are used. While index 26 on the vernier ring 24 may be adjusted to serve as an index in thread-cutting, it seems desirable to provide a fixed index mark 28 on the housing 11 for thread-cutting. To permit index mark 28 to show, a notch 29 is made in the vernier ring 24, the ring being rotated to expose the index mark 28 whenever the lathe is to be used for threading. When the lead screw 13 is turning, this gauge functions as a threading indicator; when the lead screw 13 is stationary, it acts as a fixed rack, and the gauge functions as a device for measuring length of cut.

At 32 is shown a pin or other projection attached to pointer disk 18 to facilitate moving the disk with the fingers in making adjustments. It is understood that more than one such projection could be attached to disk 18; and that by extending disk 20 beyond disk 18, and shaping pointer 19 to provide clearance, similar projections could be provided on disk 20 (not shown) to be used in conjunction with or instead of holes 33 and 34 to facilitate adjustment.

To insure maximum accuracy, the gear 12 should be in absolute mesh with rack or lead screw 13, so there is no play between 12 and 13. However, this is seldom the case in practice. As long as the movement of the gauge is in one direction with respect to 13, natural frictional drag usually will hold the gear and rack or lead screw together with sufficient constancy to permit accurate measuring. But when the direction of movement of the gauge is reversed, opposite sides of the teeth of 12 and threads or teeth of 13 come to bear, and an error may be introduced as a result of taking up the slack or backlash. In most lathe work, cutting is in one direction, so that this situation does not cause trouble. But to overcome error from play or backlash, without introducing complicated and costly mechanism, the knob 35, fixedly attached to the end of shaft 10 so it will clear rack or screw 13, is provided.

By grasping knob 35 lightly with thumb and fingers when the direction of travel of the gauge is changed, the gear 12 may be held in contact with rack or screw 13 in such a way that there is no shifting of the dial 22 as a result of backlash or play. Similarly, the knob 35 may be used to bring teeth of gear 12 into contact with rack or lead screw 13 when gauge is stationary and vernier is being set. If there is not sufficient natural drag to hold the gear 12 uniformly in contact with the rack or lead screw when gauge is moving, light pressure may be applied to the circumference of 35 by the operator's fingers or by a spring brake 39 bearing on its end a pad of leather or similar material 40.

Thus it will be seen that this invention provides an easy and accurate method of measuring movements of machine parts such as the carriage and cutting tool of a lathe; it enables the operator, in a few seconds, to set indicator stops for performing repeat duplicate operations. It provides for quick, accurate zero setting of the index mark 26, regardless of the position of the tool with respect to the carriage position at the start of the cut.

While herein has been shown and described a preferred form of the invention, it is to be understood that, without departing from the spirit of the invention, various changes may be made in constructional details and in the arrangement and combination of the parts, within the scope of the appended claims.

Having thus illustrated my invention and described it in detail, what I claim as new and desire to secure by Letters Patent is:

1. A measuring gauge for lathes and other machines comprising a housing adapted to be mounted on a moving part of the machine and travel therewith, a shaft to which is affixed a gear wheel meshing with a driving means fixed to a stationary part of the machine, a dial mounted on said shaft and graduated to indicate units of measure and fractions thereof, an index mark being provided on said housing adjacent the peripheral edge of said dial, a knob affixed to the end of said shaft adjacent to the gear wheel, said knob being arranged to be manually held to overcome play or backlash between the gear wheel and driving means.

2. A measuring gauge for lathes and other machines comprising a housing adapted to be mounted on a moving part of the machine and travel therewith, a shaft to which is affixed a gear wheel meshing with a driving means fixed to a stationary part of the machine, a dial mounted on said shaft and graduated to indicate units of measure and fractions thereof, an index mark being provided on said housing adjacent the peripheral edge of said dial, a knob affixed to the end of the shaft adjacent to the gear wheel, a brake comprising a spring and friction member engaging said knob for the purpose of introducing drag to keep the gear wheel and driving means in uniform contact.

3. A measuring gauge for lathes and other machines comprising a housing adapted to be mounted on a relatively movable part of a machine and travel therewith, a shaft to which is affixed a gear wheel meshing with driving means fixed to a stationary part of the machine, a dial mounted on said shaft, said dial being graduated to indicate units of measure and fractions thereof, a pointer on said dial, said pointer being movable to various positions with respect to said dial graduations, and means operable to hold said pointer in a set position relative to said dial, and relatively fixed indexing means on said housing for indicating the graduations on said dial, said indexing means comprising an index ring rotatably mounted on said housing to surround said dial, said index ring bearing index means in cooperative relation to the scale on said dial, an index mark being provided on a fixed part of said housing in association with the scale on the dial, said ring having an opening to render visible said index mark on said fixed part of the housing.

4. A measuring gauge for screw cutting lathes and other machines having a relatively movable part and a relatively fixed part, comprising a housing, means to secure said housing to one of said parts; a shaft rotatably mounted in said housing; a driving connection between the shaft and the other part whereby the shaft will be rotated by a relative movement of said parts; a dial secured to said shaft at one end thereof; graduation marks on said dial by which is indicated in predetermined units of measure the relative movement of said movable and fixed parts; a plurality of markers mounted in association with said dial to be adjustable to selected positions relative to said graduations; screw means threaded into said end of said shaft and having a head operable upon turning the screw to clamp said pointers against said dial in said selected positions of the pointers; a spacer interposed between opposed faces of said head and the outermost of said pointers; means cooperating between said spacer and said end of said shaft permitting clamping movement of the spacer but preventing rotation thereof relatively of the shaft; an index ring rotatably mounted on said housing and surrounding said dial; and releasable means for retaining said ring in a selected position of rotation on the housing, said ring bearing an index means in cooperative relation to said graduation marks on said dial.

5. A measuring gauge for screw cutting lathes and other machines having a relatively movable part and a relatively fixed part, comprising a housing; means to secure said housing to one of said parts; a shaft rotatably mounted in said housing; a driving connection between the shaft and the other part whereby the shaft will be rotated by a relative movement of said parts; a dial mounted on said shaft; a mark on said housing adjacent said dial; graduation marks on said dial by which is indicated in predetermined units of measure the relative movement of said movable and fixed parts; a plurality of markers mounted in association with said dial to be adjustable to selected positions relative to said graduations; means operable to fix and release said markers with reference to said dial; an index ring rotatably mounted on said housing and surrounding said dial; releasable means operable to lock said ring in a selected position of rotation, said ring bearing index means in cooperative relation to said graduation marks on said dial; said index ring being provided with a notch through which said mark on said housing may be seen.

6. A measuring gauge for lathes and other machines comprising a housing adapted to be mounted on a moving part of the machine and travel therewith, a shaft to which is affixed a gear wheel meshing with a driving means fixed to a stationary part of the machine, a dial mounted on said shaft and graduated to indicate units of measure and fractions thereof, an index mark being provided on said housing adjacent the peripheral edge of said dial, a knob affixed to said shaft, said knob being arranged to be held to overcome play or backlash between the gear wheel and driving means.

WALTER ERVIN BURTON.

REFERENCES CITED

The following references are of record in the file of this patent:

UNITED STATES PATENTS

| Number | Name | Date |
|---|---|---|
| 1,389,341 | Blood | Aug. 30, 1921 |
| 1,863,007 | Elkins | June 14, 1932 |

FOREIGN PATENTS

| Number | Country | Date |
|---|---|---|
| 528,665 | French | Aug. 23, 1921 |
| 546,924 | French | Sept. 6, 1922 |
| 130,295 | British | July 31, 1919 |